(12) United States Patent
Manser et al.

(10) Patent No.: US 8,857,317 B2
(45) Date of Patent: Oct. 14, 2014

(54) PORTION-CONTROLLED NUTRITION SYSTEM AND METHOD USING CAPSULES

(75) Inventors: Daniel Roland Manser, Spiez (CH); Anne Roulin, Yverdon-les-Bains (CH); Matthew David Steven, Cavite (PH); Heinz Wyss, Oberdiessbach (CH); Yann Epars, Penthalaz (CH); Conchita Tran, Gimel (CH)

(73) Assignee: Nestec S.A., Vevey (CH)

( * ) Notice: Subject to any disclaimer, the term of this patent is extended or adjusted under 35 U.S.C. 154(b) by 162 days.

(21) Appl. No.: 13/003,474

(22) PCT Filed: Jul. 2, 2009

(86) PCT No.: PCT/EP2009/058338
§ 371 (c)(1),
(2), (4) Date: Feb. 9, 2011

(87) PCT Pub. No.: WO2010/003878
PCT Pub. Date: Jan. 14, 2010

(65) Prior Publication Data
US 2011/0262601 A1 Oct. 27, 2011

(30) Foreign Application Priority Data
Jul. 8, 2008 (EP) .................................... 08159947

(51) Int. Cl.
*A47J 31/56* (2006.01)
*A23L 1/29* (2006.01)
*A47J 31/40* (2006.01)

(52) U.S. Cl.
CPC ............... *A23L 1/296* (2013.01); *A47J 31/407* (2013.01)

USPC .......................................... 99/289 R; 99/295

(58) Field of Classification Search
USPC ........... 99/295, 302 R, 289 R; 426/77, 78, 80
See application file for complete search history.

(56) References Cited

U.S. PATENT DOCUMENTS

| 5,974,950 A * | 11/1999 | King .......................... 99/289 R |
| 7,216,582 B2 * | 5/2007 | Yoakim et al. .................. 99/295 |
| 7,685,930 B2 * | 3/2010 | Mandralis et al. .............. 99/295 |
| 7,798,055 B2 * | 9/2010 | Mandralis et al. .............. 99/295 |
| 7,863,546 B2 * | 1/2011 | Hestekin et al. .............. 219/507 |
| 7,987,767 B2 * | 8/2011 | Hester et al. .................... 99/280 |

(Continued)

FOREIGN PATENT DOCUMENTS

| EP | 1 440 640 | 7/2004 |
| EP | 1843685 | 10/2007 |

(Continued)

*Primary Examiner* — Reginald L Alexander
(74) *Attorney, Agent, or Firm* — K&L Gates LLP

(57) ABSTRACT

Nutritional delivery system using single-serve capsules comprising: a dispenser for a nutritional composition comprising means for providing water into a single-use capsule containing a portion-controlled serving of a nutritional formula; different types of capsules (10,11,12,13,14,15,16) being designed according to a nutritional feeding plan corresponding to persons or categories of persons to be fed, each type comprising capsules containing a nutritional formula; the capsules of different types having at least one differentiating characteristic so that each type of capsules corresponds to a feeding time period determined by the feeding plan; control operation means associated to each type of capsules, said means comprising information relating to at least one differentiating operational parameter relevant to produce and deliver a differentiated nutritional liquid in the dispenser according to the feeding plan.

11 Claims, 3 Drawing Sheets

(56) References Cited

U.S. PATENT DOCUMENTS

| | | | |
|---|---|---|---|
| 2002/0048621 A1* | 4/2002 | Boyd et al. | 426/77 |
| 2005/0150391 A1* | 7/2005 | Schifferle | 99/295 |
| 2006/0000851 A1 | 1/2006 | Girard et al. | |
| 2008/0050490 A1 | 2/2008 | Stalder et al. | |
| 2008/0302251 A1* | 12/2008 | Rijskamp et al. | 99/295 |

FOREIGN PATENT DOCUMENTS

| | | |
|---|---|---|
| JP | 2005520667 | 7/2005 |
| WO | 03 073896 | 9/2003 |
| WO | 2005122851 | 12/2005 |
| WO | 2006077259 | 7/2006 |
| WO | 2008 079462 | 7/2008 |

* cited by examiner

PORTION-CONTROLLED NUTRITION SYSTEM AND METHOD USING CAPSULES

The present invention relates to a portion-controlled nutrition system and method adapted for persons requiring a differentiated nutritional feeding such as infants, the infirm, elderly people or athletes.

Considering infant feeding, in particular, mother's milk is recommended. However, in some cases breast feeding is inadequate or unsuccessful or inadvisable for medical reasons or the mother chooses not to breast feed. Infant formulae have been developed for these situations.

Generally infant formulae are available in powder form, concentrated liquid form, or ready to feed liquid form. Powdered infant formulae are the most popular form; primarily due to their cost and nutritional quality. The key disadvantage with powdered infant formulae is the inconvenience of preparation. The powdered formula must be spooned into a sterilized drinking vessel, water which has been boiled and allowed to cool is then poured into the drinking vessel to reconstitute the formula, the drinking vessel is then sealed and shaken to ensure the powder has been dissolved. To avoid any bacterial growth, the formula should then be consumed immediately after reconstitution.

If prepared and consumed in this manner, powdered infant formulae provide a safe and nutritionally good substitute for mother's milk in the situations described above. However, primarily due to the inconvenient preparation, many parents or caregivers do not prepare the formulae properly and hence expose the infant to risks of infection or other risks. For example, the water may not be boiled prior to use in which case, any pathogens in the water are fed to the infant. Alternatively, batches of the infant formula may be prepared and then stored until needed. Unfortunately, if any pathogen has contaminated the formula, it then has time to replicate.

In hospitals and other care facilities where infants cannot receive one to one attention, the practicalities associated with preparing infant formula for large numbers of infants coupled with concerns about the risk of growth of pathogens in reconstituted formula which is not consumed for several hours have led to drastic measures. For example, some hospitals will not use any powdered products insisting on the use of individual bottles of sterilized ready to drink formula. Other hospitals will prepare all the formula required for a given period which could be as much as 48 hours and then either autoclave the prepared formula to sterilize it or keep it under refrigeration. None of these solutions is ideal from a nutritional point of view. The severe heat treatment necessary to ensure sterilization can both promote undesirable reactions between the protein and carbohydrate components of the formula and degrade more sensitive components such as vitamins and probiotics. Further, the manufacture and distribution of individual bottles of sterilized liquid formula requires much more packaging as well as leading to higher transportation costs.

Infant formulae in concentrated liquid form suffer substantially the same disadvantages as powdered infant formulae. Hence they do not provide a better solution. Infant formulae in ready to feed form should in theory provide a solution to the inconvenience of preparation. However, they have their own disadvantages; in particular they are much more costly and bulky. Further, it is often necessary to provide them in a size enabling multiple feeds. However, once opened for the first feed, a contamination risk occurs if the opened package is stored and used for subsequent feeds.

Similar issues arise with other nutritional compositions for children such as growing up milks and infant cereals, and for nutritional compositions for adults such as nutritional products used in health care environments.

EP1843685 provides a convenient and safe method and system of preparing a single serving of nutritional composition comprising introducing water into a sealed disposable capsule containing a unit dose of the composition and operate opening contained within the capsule to permit draining of the resulting liquid directly from the capsule into a receiving vessel.

There is a further need for a system of this kind which can prepare in an automatic and safe manner a perfectly well balanced and dosed nutritional liquid from a nutritional composition according to the age and/or other specific requirements of the infant without requiring specific skills or attention from the operator of the system.

Indeed, all mothers and caregivers have experienced the difficulties of preparing in baby bottles the right infant formula in relation to a proper dosage, a proper liquid volume and an adequate formula adapted to the age of the infant. For instance, the amount of the dry infant formula might be correct but it can be mixed to a too small amount or to a too high amount of water or be insufficiently dissolved or mixed. In the first case, the baby might not be sufficiently hydrated whereas in the other cases, the baby might not receive sufficient nutrition.

As another example, as the baby becomes older, there are several combined parameters that change and which require particular attention from the mothers and caregivers. In particular, the volume of the infant composition generally increases and the composition of the infant formula evolves from so-called starter formula to so-called follow-up formulae. The formula may differ according to the age of the infant in view of numerous changes regarding the nutritional and energetic properties. For example, co-pending patent application No. 07121541.2 relates specifically to an age-tailored nutrition system and a method adapted for an infant in the first six months, wherein the formulae in their whey:casein ratio as well as the protein content of each formula may decrease according to the age.

Therefore, there is a need to propose a convenient, reliable and safe, portion controlled, nutrition system which delivers the correct portion of infant formula according to the specific needs of the infant. In particular, in order to deliver the correct portion of infant formula, it is required that the total formula content is dissolved/dispersed in the volume of water and that substantially no residual amount is left in the capsule.

Accordingly the present invention provides a nutritional delivery system using single-serve capsules comprising:
- a dispenser for a nutritional composition comprising means for providing water into a single-use capsule containing a portion-controlled serving of a nutritional formula,
- different types of capsules being designed according to a nutritional feeding plan corresponding to persons or categories of persons to be fed, each type comprising capsules containing a nutritional formula; the capsules of different types having at least one differentiating characteristic so that each type of capsules corresponds to a feeding time period recommended by the feeding plan,
- automatic control operation means associated or related to each type of capsules, said means comprising information relating to at least one differentiating operational parameter and providing automatic control for producing and delivering a differentiated nutritional liquid in the dispenser according to the nutritional feeding plan.

The present invention also relates to a method for delivering a nutritional liquid to categories of persons requiring differentiated nutritional feedings according to a nutritional feeding plan, comprising a portion-controlled nutrition system using a single-serve capsule and a dispenser for receiving the capsules and delivering a differentiated nutritional liquid by mixing water with the nutritional formula contained in said capsule, wherein said method further comprises:

providing different types of capsules; the capsules of different types having at least one differentiating characteristic so that each type of capsules corresponds to a time period recommended by the nutritional feeding plan, each type of capsules being so designed for persons or categories of persons requiring a differentiated nutritional feeding over a determined period of time and, controlling the operation of the dispenser including mixing water with the nutritional formula in the capsule according to at least one differentiating operational parameter relevant for delivering the differentiated nutritional liquid in compliance with said nutritional feeding plan.

Preferably, each type of capsules corresponds to a feeding period which has been determined, e.g., by nutritional specialists, to match at best the needs of the specific categories of persons. Considering infants as the preferred example of the invention, different types of capsules can be designed in relation to the different key growth periods of the infant.

In the context of the invention, the feeding plan is primarily designed to adapt the nutritional feed to a predetermined age range by providing potentially differentiated capsules (e.g., size) including potentially differentiated content and/or formulation and adapted to be operated in a differentiated manner (e.g., reconstitution volume) by capsule-related control means (e.g., code means, visual marks, etc.).

Preferably, the nutritional feeding plan is a feeding plan designed for infants, respectively, toddlers. The nutritional formula is an infant formula, respectively toddler formula, and the nutritional feeding plan provides a feed regime for infants, respectively toddlers, corresponding to a growth period (i.e., said time period) of the infant, respectively toddler, covering several age ranges.

In a mode of the invention, the type of capsules can be differentiated by at least their size which differs for at least two different types of capsules. The different sizes of capsules enable to provide different amounts of the nutritional formula and different water volumes (i.e., reconstitution volume) for mixing with the formula in the capsule. For example, different capsules sizes can be provided for the preparation of infant formulae for infants of different ages. In particular, the size of capsule can progressively increase as a function of the age of the infant to be fed. In particular, the proportion of the volume of the capsule filled with the nutritional formula relative to the total available volume in the capsule varies for each type of capsules.

In still a mode of the invention, the types of capsules are differentiated by the amount of the nutritional formula which differs for at least two different types of capsules. In particular, for categories of persons such as infants, the content of infant formula increases as the infant becomes older. The increase may be a progressive increase or a step-by-step increase. For example, the amount of infant formula for an infant increases as a function of the age of the infant. Therefore, at least within a certain range of ages, the amount of nutritional formula also increases according to the increase of size of the capsules. For a step-by-step increase, the amount of nutritional formula can be substantially the same for two types of capsules covering two adjacent periods of age within the whole range of capsules and the amount of nutritional formula can increase for capsules designed below and above said periods of age. Furthermore, the amount of nutritional formula can increase for a same size of capsule so that within the whole range of capsules, two capsules covering two adjacent periods of age can contain different amounts of nutritional formula. One advantage is that a feeding plan, such as for infants of the age of between 0 and 36 months can be determined while using a limited number of sizes of capsules.

Furthermore, each type of capsules can also be differentiated by the recipe of the nutritional formula which differs for each type. For example, the recipe differs in the capsules as a function of the age of the infant.

Therefore, the recipe can differ according to the different sizes of capsules, e.g., to fit the age of the infant to be fed. Furthermore, the recipe can also differ for each size of capsules in order to reduce the number of sizes of capsules.

For example, the types of capsules can differ from each other regarding the nature and/or the amount of any of the following nutrients amongst the group consisting of: proteins, carbohydrates, lipids, probiotics, micronutrients and combinations thereof.

More particularly, for infants of age between 0 and 12 months, the whey:casein ratio of each formula is chosen in the range of from 100:0 to 40:60 and decreases according to the age of the infant. Also for infants of age between 0 and 12 months, the protein content of each formula decreases according to the age of the infant. Generally, the infant formula is chosen in the range of 4.6 to 6.0 lipid/100 kcal and decreases with the increasing age of the infant. In particular, the lipid source includes milk fat.

According to a preferred aspect of the invention, the at least one differentiating operational parameter relevant to produce and deliver the differentiated nutritional formula liquid from the dispenser includes at least the volume of water that is mixed with the formula in the capsule for reconstitution of the nutritional liquid. Therefore, the volume of water is automatically adjusted according to the predetermined nutritional feeding plan so that the person being fed receives the optimized volume of liquid. The volume of water is preferably automatically adjusted by the control operation means without allowing the user to modify such volume. It is indeed important for infants, for instance, that the volume of delivered liquid is absolutely controlled so that the feeding plan is precisely respected. Moreover, a too low volume of reconstituting water leads to hydration problems, dissolution problems or a reconstituted liquid of inappropriate texture that can be difficult to swallow for the baby. On the contrary, too much water can lead to difficulties for the infant to drink it all, which may cause behavior disorders on the short term and nutritional deficiencies on the long term. Therefore, according to the system of the invention, the volume of water is controlled by the controlling means according to the type of capsules which is inserted in the dispenser so that the correct volume of water is mixed with the nutritional formula for reconstitution of the nutritional liquid.

Other differentiating parameters can be controlled by the control means according to the types of capsules in the dispenser such as the temperature of water and/or the water injection pressure in the capsule. Typically, for infants the water temperature which is fed into the capsule is preferably controlled between 30 and 40 degrees. Typically, water is supplied from a water reservoir and is heated to the controlled temperature before being mixed in the capsule. In order to ensure a microbiological safety of the liquid dispensed in the capsule, a microbial filter is provided in the system. The microbial filter can be placed anywhere between the water heater and the point of delivery of the nutritional liquid of the capsule. Preferably, the filter is inserted in the capsule itself such as upstream of the compartment containing the nutritional formula. The use of a filter may be omitted or replaced by another water treatment or sanitation method operated in the dispenser. Also, the use of bottled water can be recommended for mixing with the nutritional formula in the dispenser.

The capsule of the invention can be a rigid or semi-rigid container containing the nutritional formula. Preferably, the capsule has an outlet duct for guiding the flow of nutritional liquid directly to the receiving receptacle, e.g., baby bottle, without contaminating the surroundings nor the dispenser itself. The capsule may further comprise a delivery system which opens the flow of the nutritional liquid toward or in the duct. Such delivery system can be a combination of a membrane and perforating elements that opens under a mechanical and/or liquid pressure or, alternatively, a valve means such as a silicone or rubber valve that opens under pressure of liquid. The outlet duct can also be a disposable part of the dispenser that is inserted in the capsule with its outlet part protruding outside the capsule.

In a general sense, the differentiating parameter for each type of capsules and/or the differentiating operational parameter for processing the capsule according to its type, differ according to the age of the person, e.g., infant, to be fed. Taking the preferred example of an infant nutritional plan, the delivered nutritional liquid can be tailored, firstly, according to the different types of capsules which can differ according to a combination of size, amount of nutritional formula, recipe of the nutritional formula and, secondly, according to the volume of water which is mixed into the capsules and which differs thus for each type.

More particularly, as the infant becomes older, the size of the capsule increases, the content of the nutritional formula increases, the recipe is adapted to the age and the controlled volume of water delivered is also increased. In general, the volume of water for reconstituting the nutritional liquid increases as a function of the size of the capsule, i.e., the larger the capsule, the larger the water volume fed in the capsule.

According to an important aspect of the invention, the dispensing system comprises control means enabling to control certain operational parameters of the dispenser as a function of the type of capsules which is inserted in the dispenser.

In a first mode, the control operation means comprises a code associated to each type of capsules and reader means associated to the dispenser for reading the code and a control unit configured to control the preparation of the nutritional formula liquid according to at least one differentiating parameter relating to the code. Therefore, the type of capsules is automatically recognized in the dispenser and the correct operational parameters are automatically set for enabling the delivery of the proper nutritional liquid. This control means guarantees that the nutritional plan can be followed by the user since the capsule can always be processed in compliance with specifications of the nutritional feeding plan.

The coding system can be any suitable coding technology available in the art including optical, shape or mechanical coding means or radio-frequency coding means. Optical recognition means includes barcodes, colour or symbols recognition. The radio frequency means includes chip RFID tags or chipless RFID tags such as wave SAW, thin film inductor capacitor, printed electromagnetic inductive ink, thin film transistors (TFTC), material-based recognition systems such as wires, stripes and layers of inductive material sensed by a magnetic coil reader. Other coding system can be numbers, characters, sounds, impulses, etc.

Therefore, according to this preferred mode, an identification code is associated to each type of capsules in order for the control unit to recognize the type of capsule and process the capsule accordingly. The code can contain an identification information which is identical for all capsules of a same type under the form of a binary code for instance, or a magnetic or electro-magnetic signal. The identification code may also contain information which varies from capsule to capsule of the same type such as serial numbers, in order to provide the opportunity to carry out the authentication of the capsule before processing it.

In particular, for infant formulae, each type of capsules comprises a specific code corresponding to the volume of water to be supplied by the dispenser in the capsules. The dispenser comprises a code reader for detecting the code on the capsule and a control unit for controlling the preparation of the nutritional formula liquid according to the information, e.g., a binary code, read by the reader.

According to an alternative, the control operation means comprise identifiable keys; each one corresponding to a selected program enabling to operate one type of capsules in the differentiated manner according to the differentiated operational parameters set in the programs. In this case, the identifiable keys are related to the different types of capsules although not directly associated to them (e.g., fixed thereon). The identifiable keys are preferably placed on a panel of the dispenser such as under the form of a keyboard or virtual keys appearing on a touch screen. These keys are selectively actuated by the user for initiating the controlled preparation of the nutritional formula liquid. In particular, a plurality of visual marks on the capsules is provided; each mark corresponding to one type of capsules, and a multi-choice activation means on the dispenser matching the plurality of visual marks and operating a control unit configured to control the preparation of the nutritional formula liquid according to the differentiating parameter relating to the choice made by the user on the multi-choice activation means. Therefore, instead of having codes for differentiating the types of capsules, this embodiment proposes differentiable marks, e.g., a selection of colours, alphanumerical indicia, trademarks, signs, symbols, etc., provided for each type of capsules and the corresponding marks on the dispenser associated to activation means, e.g., a keyboard or touch screen, for enabling the user to start the operation steps of the capsule in the dispenser.

The term "differentiating characteristic" refers to a technical feature of the capsule, including the container itself and the nutritional formula contained in the container, which can effect a differentiation in the dispensed nutritional liquid.

The term "differentiating operational parameter" refers to a parameter which can be controlled or varied in the processed operation of the capsule in dispenser which can effect a differentiation in the dispensed nutritional liquid.

The term "nutritional liquid" refers to the composition as dispensed from the dispenser and is not limited to a composition of pure liquid texture but may encompass a suspension in a liquid, a puree, a mixture of foam and liquid and/or a gel.

The term "size of the capsule" refers to the volume of the capsule available for containing the nutritional formula.

The invention will now be described in relation to the figures.

In this specification, the following terms have the following meanings:

It exists international, US and European codes for defining the range of ages of an "infant" which are not fully harmonized. However, in the context of the invention, "infant" means an infant or a young child up to the age of 36 months (unless specified otherwise in the present description).

"Infant formula" means a foodstuff intended for participating to the complete or partial nutrition of an infant or young child during the first 36 months of life (unless specified otherwise in the present description).

All percentages are by weight unless otherwise stated.

Figure 1:
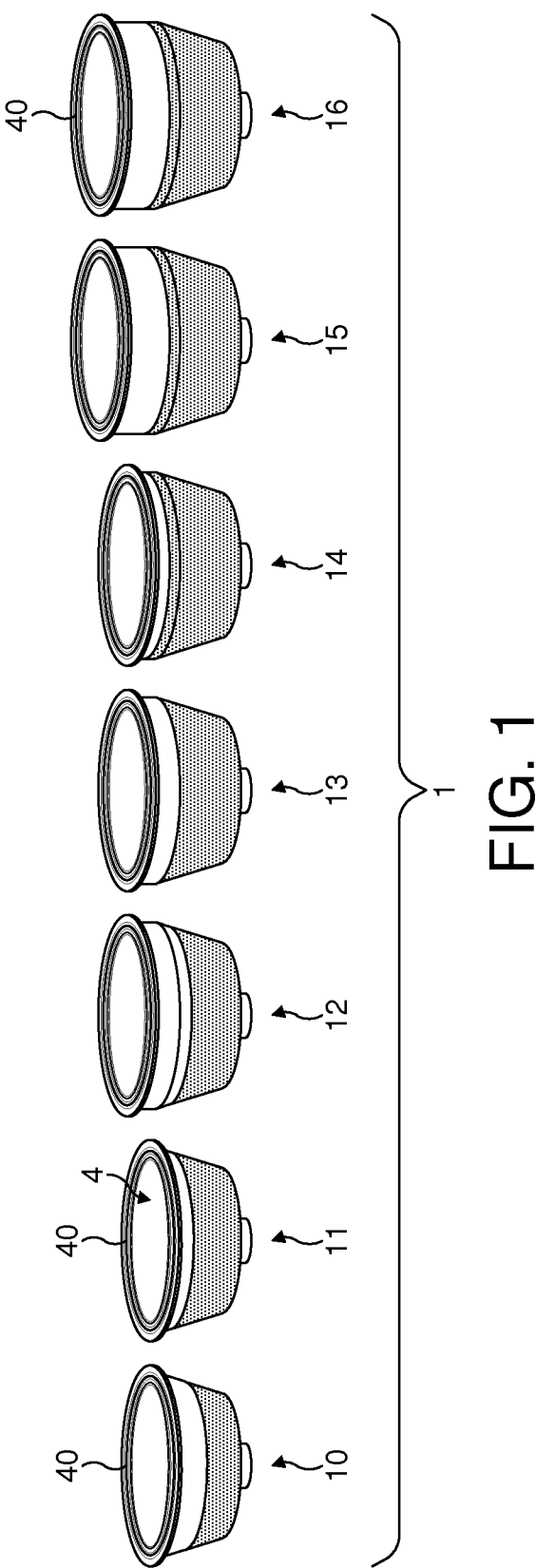
FIG. 1 is a representation of a range of capsules according to a feeding nutritional plan for infants.

The invention provides a nutritional delivery system using single-serve capsules as illustrated as a matter of example in FIG. 1. The capsules contain nutritional formulae intended to be processed, under specific control, in a nutritional dispenser for providing a metered amount of warm water in the capsule and for delivering after mixing of the nutritional formula in the capsule with said amount of water, a nutritional liquid tailored to the needs of a certain category of persons, e.g., infants.

The capsules are organized in a range of capsules' types 10, 11, 12, 13, 14, 15, 16, all types being designed according to a recommended nutritional feeding plan, each one being designed to provide a nutritional portion for a recommended age period of the infant. Thus, each type of capsules corresponds more particularly to an infant of a certain age.

For example:
capsule 10 provides a recommended nutritional portion for an infant of one or two weeks,
capsule 11 provides a recommended nutritional portion for an infant of between 3 to 4 weeks,
capsule 12 provides a recommended nutritional portion for an infant of between 5 to 8 weeks,
capsule 13 provides a recommended nutritional portion for an infant of between 9 weeks to 4 months,
capsule 14 provides a recommended nutritional portion for an infant of between 5 and 6 months,
capsule 15 provides a recommended nutritional portion for an infant of between 7 to 8 months,
capsule 16 provides a recommended nutritional portion for an infant of between 9 and 12 months.

For instance, the types of capsules in the range can cover at least two different sizes of capsules. More preferably, it covers three different sizes; i.e., "Small", "Medium" and "Large". More specifically, the first two types of capsules 10, 11 can be designed with the smallest size. The last two types of the capsules 15, 16 can be designed with the largest size and the three intermediate types of capsules 12, 13, 14 can be designed at a medium size.

Furthermore, within each size, the capsules can be filled up with a specific weight of nutritional formula as a function of the age of the infant to be fed. For example, the smallest size of capsule can be filled up with an amount of nutritional formula which varies between about 5 and 17 grams solids. The medium size of capsule can be filled up with an amount of nutritional formula which varies between 13 and 27 grams solids. The largest size of capsules can be filled up with an amount of nutritional formula which varies between 20 grams and 38 grams solids. The amount of nutritional formula can increase on a step-by-step basis within the range according to the period of age of the infant as determined by the nutritional feeding plan with possibly capsule types adjacent in the range having a substantially equal amount of ingredients but different sizes enabling reconstitution with different volumes of water. In general, the free volume in the capsule (e.g., the volume not filled by the formula) increases as a function of the age increase of the infant thus enabling a higher reconstitution volume of water to be mixed in the capsule with the formula.

As the size of the capsule increases as a function of the water volume fed in the capsule, the nutritional formula is properly mixed in the capsule and the risk of residual solids in the capsule is reduced. In particular, the size of the capsule is adapted to receive the dedicated volume of water so that the optimal mixing is obtained and then emptying can be carried out so that substantially no residue is left in the capsule. Preferably, for obtaining good dissolution in water of the powdered nutritional formula, the ratio of the capsule size to the water volume is selected to be comprised between 0.25 and 0.5, most preferably between 0.3 and 0.45. No head space is necessary in the capsule so that the nutritional formula in a powder form can occupy the whole ingredient's compartment of the capsule. The powder can be slightly compacted in the capsule so that its volume before filling exceeds somewhat the size of the capsule. A headspace lower than 10 ml is preferred, e.g., between 0 and 5 ml. Preferably, water is fed in the capsule in the form of at least one high-velocity jet. Emptying of the capsule after water injection can generally be obtained by injecting subsequently a compressed gas, e.g., compressed air, in the capsule.

The nutritional formula contained in the capsule can take various forms such as powder, concentrated liquids or gels and combinations thereof. The capsules of each type can be packed in containers (e.g. boxes) and can be sold separately from the capsules of the other types. In an alternative, more than one type of capsules can be presented to the consumer in multipacks containing a sufficient number of capsules to meet the requirements for an infant of at least two periods of age, e.g., from one to four weeks or from 2 to 6 months, for instance.

In order for each type of capsules to be recognized and treated properly in the dispenser, each type of capsule preferably comprises a code such as a barcode 40, a mechanically or magnetically discriminating identifier and the like.

According to one aspect of the invention, each type of capsules in the range comprises a tailored nutritional formula which is a function of the nutritional need of the infant in function of his/her age.

In particular, the capsules for infant formulae, in particular, starter formulae and follow-up formulae, comprise a protein source comprising whey and casein proteins for providing an age-tailored nutrition system to an infant. The capsules comprise at least two different infant formulae, each formula having a whey casein ratio chosen in the range from 100:0 to 40:60, preferably from 70:30 to 50:50 according to the age of the infant and a protein content chosen in the range from 1.5 to 3.0 g protein/100 kcal, preferably from 1.8 to 2.5 g protein/100 kcal according to the age of the infant. Both the whey:casein ratio and the protein content decrease with increasing age of the infant. Thus, an age tailored nutrition system according to the invention may comprise for example a first infant formula with a whey:casein ratio of 70:30 and a protein content of 2.5 g protein/100 kcal for an infant in the first two weeks of life, a second infant formula with a whey:casein ratio of 60:40 and a protein content of 2.0 g protein/100 kcal for an infant in the next six weeks of life and a third infant formula with whey:casein ratio of 60:40 and a protein content of 1.8 g protein/100 kcal for an infant in the third to sixth months of life.

Such an age-tailored nutrition system may additionally comprise a fourth infant formula having a whey:casein ratio of 50:50 and a protein content of 1.8 g protein/100 kcal. Such a formula would be suitable for an infant in the second six months of life.

The infant formulae for use in the age-tailored nutrition system of the invention may further comprise a carbohydrate source and a lipid source. Either of the carbohydrate content and the lipid content of the formulae may also vary as a function of the age of the infant and preferably both the carbohydrate content and the lipid content will so vary. Generally speaking, the carbohydrate content may increase with increasing age of the infant for example from 9.0 to 12.0 g carbohydrate/100 kcal, preferably from 10.1 to 11.6 g carbohydrate/100 kcal and the lipid content may decrease with increasing age of the infant, for example from 6.0 to 4.5 g lipid/100 kcal, preferably from 5.6 to 5.1 g lipid/100 kcal.

The type of protein is not believed to be critical to the present invention provided that the minimum requirements for essential amino acid content are met and the requirements as to whey:casein ratio and protein content are satisfied. Thus, protein sources based on whey, casein and mixtures thereof may be used. As far as whey proteins are concerned, acid whey or sweet whey or mixtures thereof may be used as well as alpha-lactalbumin and beta-lactoglobulin in whatever proportions are desired.

The whey protein may be modified sweet whey. Sweet whey is a readily available by-product of cheese making and is frequently used in the manufacture of infant formulae based on cows' milk. However, sweet whey includes a component which is undesirably rich in threonine and poor in tryptophan called caseino-glyco-macropeptide (CGMP).

The proteins may be intact or hydrolysed or a mixture of intact and hydrolysed proteins. It may be desirable to supply partially hydrolysed proteins (degree of hydrolysis between 2 and 20%), for example for infants believed to be at risk of developing cows' milk allergy. If hydrolysed proteins are required, the hydrolysis process may be carried out as desired and as is known in the art.

The infant formulae for use in the capsules of the present invention may contain a carbohydrate source. Any carbohydrate source conventionally found in infant formulae such as lactose, saccharose, maltodextrin, starch and mixtures thereof may be used although the preferred source of carbohydrate is lactose.

The infant formulae for use in the capsules of the present invention may contain a lipid source. The lipid source may be any lipid or fat which is suitable for use in infant formulae. Preferred fat sources include milk fat, palm olein, high oleic sunflower oil and high oleic safflower oil. The essential fatty acids linoleic and α-linolenic acid may also be added as may small amounts of oils containing high quantities of preformed arachidonic acid and docosahexaenoic acid such as fish oils or microbial oils. The lipid source preferably has a ratio of n-6 to n-3 fatty acids of about 5:1 to about 15:1; for example about 8:1 to about 10:1.

The infant formulae for use in the present invention may also contain all vitamins and minerals understood to be essential in the daily diet and in nutritionally significant amounts. Minimum requirements have been established for certain vitamins and minerals. Examples of minerals, vitamins and other nutrients optionally present in the infant formula include vitamin A, vitamin $B_1$, vitamin $B_2$, vitamin $B_6$, vitamin $B_{12}$, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. Minerals are usually added in salt form. The presence and amounts of specific minerals and other vitamins will vary depending on the intended infant population.

The infant formulae may also comprise at least one probiotic bacterial strain. A probiotic is a microbial cell preparation or components of microbial cells with a beneficial effect on the health or well-being of the host. Suitable probiotic bacterial strains include *Lactobacillus rhamnosus* ATCC 53103 obtainable from Valio Oy of Finland under the trade mark LGG, *Lactobacillus rhamnosus* CGMCC 1.3724, *Lactobacillus paracasei* CNCM I-2116, *Bifidobacterium lactis* CNCM I-3446 sold inter alia by the Christian Hansen company of Denmark under the trade mark Bb12 and *Bifidobacterium longum* ATCC BAA-999 sold by Morinaga Milk Industry Co. Ltd. of Japan under the trade mark BB536. The amount of probiotic, if present, likewise preferably varies as a function of the age of the infant. Generally speaking, the probiotic content may increase with increasing age of the infant for example from 10e3 to 10e12 cfu/g formula, more preferably between 10e4 and 10e8 cfu/g formula (dry weight).

The infant formulae may also contain at least one prebiotic in an amount of 0.3 to 10%. A prebiotic is a non-digestible food ingredient that beneficially affects the host by selectively stimulating the growth and/or activity of one or a limited number of bacteria in the colon, and thus improves host health. Such ingredients are non-digestible in the sense that they are not broken down and absorbed in the stomach or small intestine and thus pass intact to the colon where they are selectively fermented by the beneficial bacteria. Examples of prebiotics include certain oligosaccharides, such as fructooligosaccharides (FOS) and galactooligosaccharides (GOS). A combination of prebiotics may be used such as 90% GOS with 10% short chain fructo-oligosaccharides such as the product sold under the trade mark Raftilose® or 10% inulin such as the product sold under the trade mark Raftiline®.

The infant formulae may optionally contain other substances which may have a beneficial effect such as lactoferrin, nucleotides, nucleosides, and the like.

Preferably, the nutrition system further comprises a neonatal supplement including a carbohydrate source and a probiotic bacterial strain in an amount between 10e3 and 10e6 cfu/g supplement. The neonatal supplement can be filled in a capsule of the smallest size to complete the range of capsules intended in the infant nutritional feeding plan as aforementioned.

The invention extends to a method of providing nutrition to an infant in the first six months of life comprising feeding to the infant for at least part of the first one to eight weeks of life a first infant formula having a protein source comprising whey and optionally casein proteins and having a whey:casein ratio between 100:0 and 60:40 and a protein content between 2.0 and 3.0 g protein/100 kcal and feeding to the infant for at least part of the remainder of the first six months of life a second infant formula having a protein source comprising whey and casein proteins and having a whey:casein ratio between 70:30 and 50:50 and a protein content between 1.7 and 2.1 g protein/100 kcal with the proviso that either the protein content or the whey:casein ratio of the second formula or both is/are lower than for the first formula.

Preferably the method according to the invention comprises feeding to the infant for about the first two to four weeks of life a first infant formula having a protein source with a whey:casein ration between 80:20 and 60:40 and a protein content between 2.0 and 3.0 g protein/100 kcal then feeding to the infant a second infant formula having a whey:

casein ratio between 70:30 and 50:50 and a protein content between 1.8 and 2.0 g protein/100 kcal. Even more preferably, the second infant formula is fed from the age of two to four weeks to the age of about two months and a third infant formula also having a whey:casein ratio between 70:30 and 50:50 and a protein content between 1.8 and 2.0 g protein/100 kcal wherein either the protein content or the whey:casein ratio of the second formula or both is/are lower than for the second formula is fed for the remainder of the first six months of the infant's life.

Figure 2:
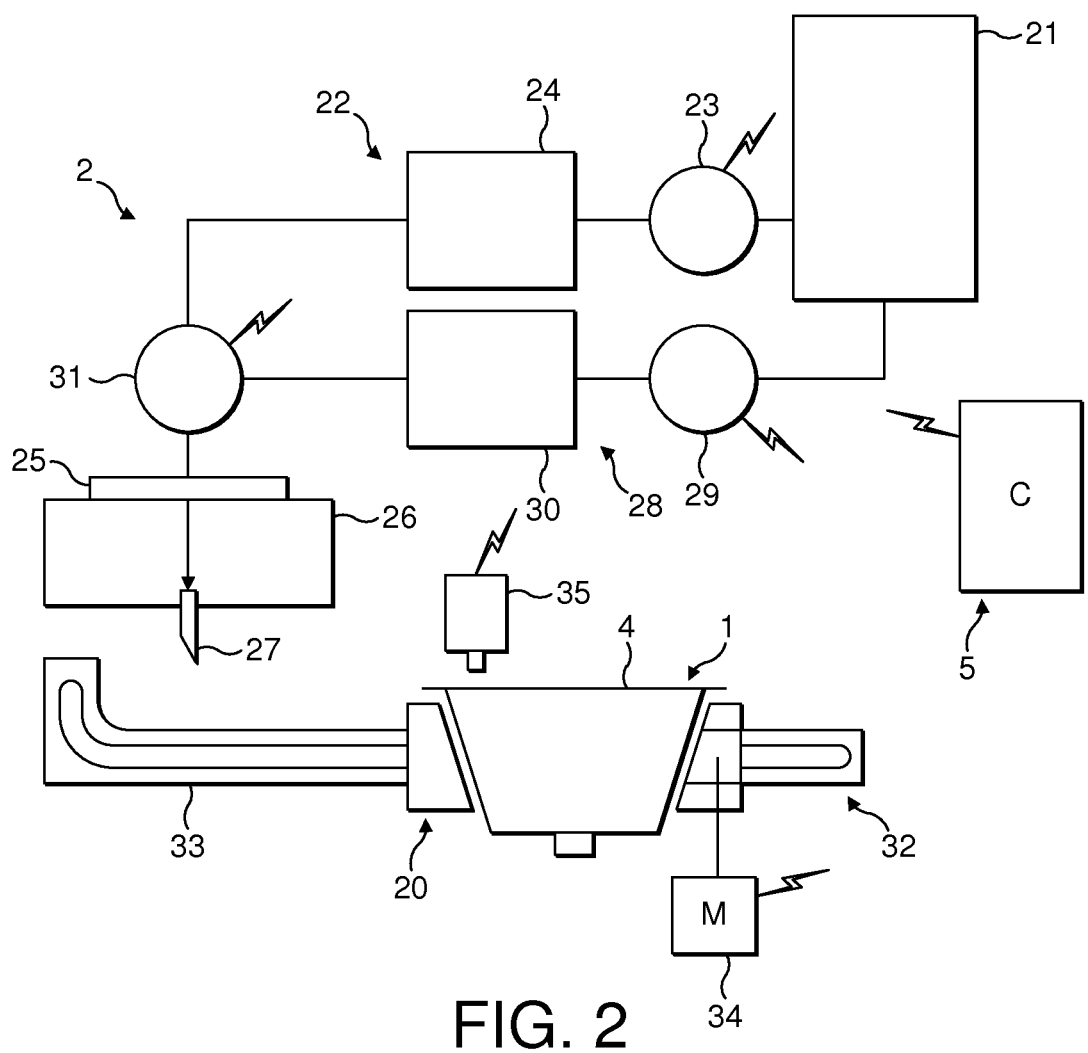
FIG. 2 is a schematic representation of a dispenser, according to the invention, when a capsule is recognized before being processed.
Figure 3:
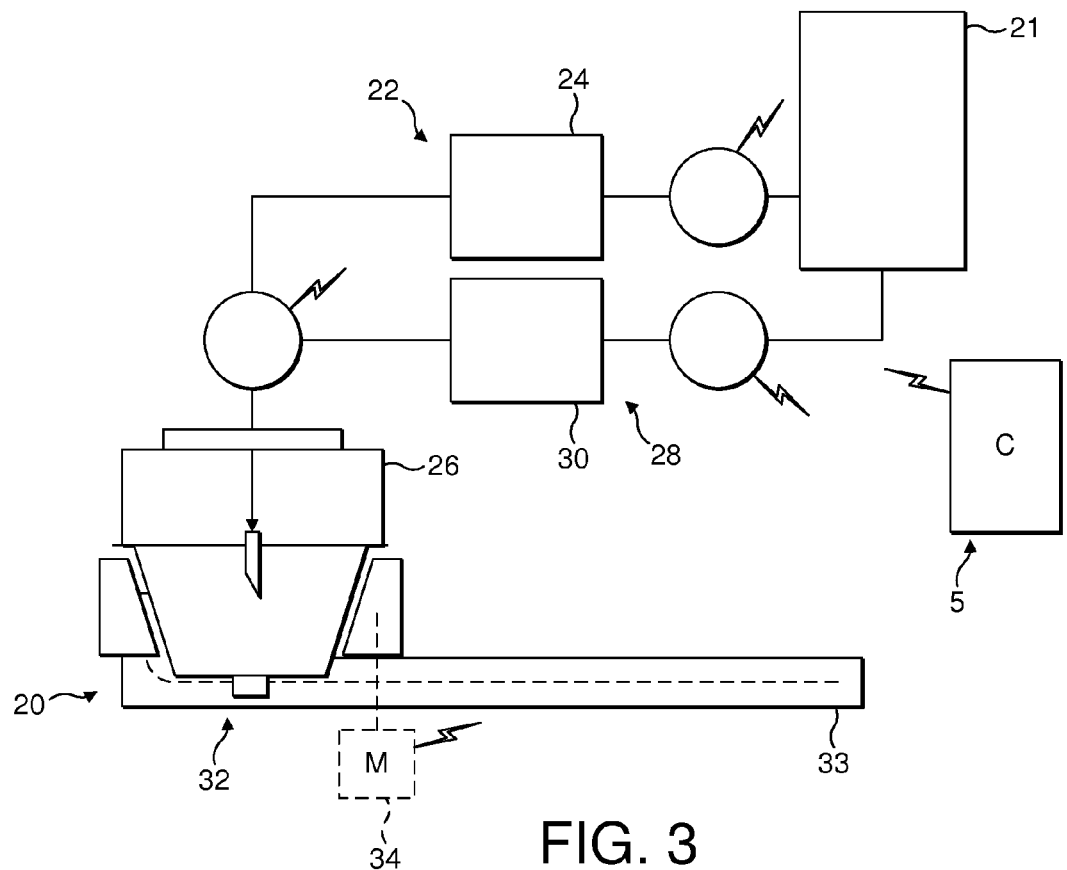
FIG. 3 is a schematic representation of a dispenser of the invention during processing.

In the system of the present invention, the capsules are individually processed in a nutritional dispenser 2 as illustrated in FIGS. 2 and 3 as a matter of preferred examples.

The capsules 1 are individually received in a capsule receiver 20 of the dispenser. The capsule can be inserted in the dispenser manually, for instance, by dropping the capsule from an opening provided on the top of the dispenser (not illustrated). Thus, the capsule is inserted in the dispenser in a stable manner for being processed. The dispenser further comprises, as known per se, a water supply 21, e.g., a replenishable water reservoir. Water from the reservoir is transported via water circuit 22 using a water transport means such as a pump 23. The pump can be chosen in the large group of liquid pumps such as piston, peristaltic, centrifugal, diaphragm, gravity pump, etc. A water heater 24 is provided in the water circuit to heat the water at the required temperature. For infant formula, the water is preferably heated to a temperature of between 30 and 40 degrees. Depending on the way the sanitation of water is performed in the dispenser, water can be heated at a sanitation temperature, e.g., at the boiling point of water and then allowed to cool down before being dispensed. In a preferred mode, water is heated at about the serving temperature and then pathogens are removed by micro filtration using a microbial filter 25 placed in the water circuit, e.g., in the dispenser or in the capsule. A preferred example of dispenser comprising a microbial filter is disclosed in co-pending European patent application No. 08100897.1 filed on 24 Jan. 2008 entitled: "Exchangeable filter for beverage production device and beverage production device comprising such filter". A system with a monitorized water and a sanitized or disposable fluid system may prevent the need for sanitizing water.

The dispenser further comprises a water dispensing head 26 ending by a water injection means such as a water injection needle 27. The needle is designed to pierce the capsule and inject a controlled volume of water in the capsule.

The dispenser can further comprise a steam circuit 28 comprising a water transport means, e.g., pump 29 and a steam generator 30. The steam circuit can be provided for regularly sanitizing the injection head and more particularly the surfaces of the head which comes in contact with the nutritional formula and liquid. A controllable three-way valve 31 can be placed at the intersection of the water and steam circuit to controllably select the passage of water or steam through the injection head. A dispenser comprising a steam circuit for sanitizing the injection head is described in co-pending patent application No. 07115146.8 filed on 29 Aug. 2007 entitled: "Dispensing device for preparing and dispensing food and/or nutritional composition".

The capsule receiver can be part of a capsule transport cart 32 which comprises guiding means 33 and a motorized drive means 34 for transporting the capsule from the capsule insertion position to the injection position. Of course, the transport of the capsule can be treated differently than by a cart provided in the dispenser. For instance, the device could comprise a capsule drawer coming in and out of the dispenser at the push of a button or a drawer manually insertable in, removable from, the dispenser.

Figure 4:
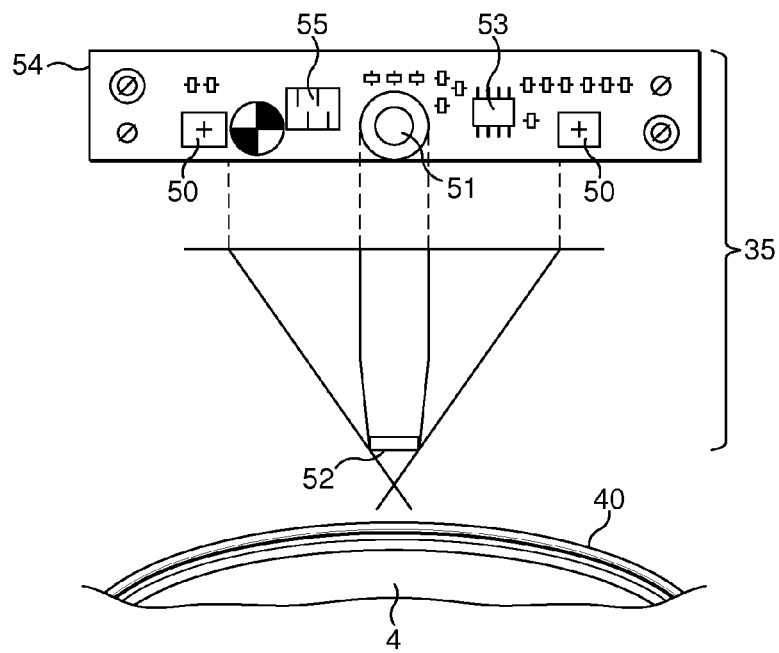
FIG. 4 is a representation of the capsule recognition means of the dispenser and capsules for controlling the operations of the dispenser.

A reading means 35 can be positioned along the transport path of the cart 32 in such a way that the code on the capsule can be properly detected by the reader 35. The reading means 35 can, for example, comprise a IR barcode detector which can read a reduced circular barcode 40 placed on the upper lid 4 of the capsule (FIG. 4). For example, a pair of IR leds 50 bring the IR-light to the reading area and a IR detector 51 generates an electrical signal depending of the reflected IR level. A focusing lens 52 is also provided to focus the IR light. The small electrical signals generated by the IR detector is amplified by a wide band analogue amplifier 53 and converted to a digital signal by a following level comparator. The electronic elements (amplifier, converter, comparator) can be placed on a small printed circuit board 54 connected via a small cable 55 to the control unit of the dispenser. The control unit 5 comprises a microprocessor which measures the pulse length of every dark ring of the circular barcode and the spaces between the rings and compares the sequence to given pattern to decode the information of the barcode rings. Each circular barcode is thus read and provides a binary code (e.g., 000, 101, 010, etc.) indicating to the control unit which type of capsules is present in the dispenser. The advantage of a circular bar code is that the code can be read in a more reliable manner from above the capsule while the capsule is in movement. The code reader can also be placed at a sufficient distance from the injection head so that the reading is not disturbed by the wet and steam environment. Of course, a linear barcode could also be utilized. Other capsule recognition means such as RFID technology can of course replace the barcode system. The technology may also be chosen as function of the number of data to be stored in the code which is itself also function of the number of capsules and the complexity of the operations in the dispenser to be controlled. For instance, RFID allows storing of a larger amount of information. Furthermore, RFID can be used to read different consumables or elements coming in the preparation of the liquid to be prepared, e.g., a disposable filter to control life time of the filter or a water bottle recommended for reconstituting the liquid formula.

Then, in FIG. 3, after reading (which can be carried out during the motion of the capsule towards its injection position), the capsule is transported by the transport cart 32 below the water injection head up to the point where the capsule is pierced. When the injection position has been recognized such as by a position sensor (not shown), the control unit 5 commands the water pump on to inject a controlled volume of water in the capsule. The volume of water is controlled in function of the type of capsules recognized by the code recognition means. In the event no code is recognized, the control unit may not activate the pump and the dispenser may send a warning signal to the user that the capsule has not been recognized.

The capsules of the invention can be of different structure. Preferred capsules are, for instance, "direct-flow" gastight capsules, preferably, as described in European patent EP1472156B or also in co-pending patent application No. 08152871.3 filed on 18 Mar. 2008 entitled: "Cartridge for preparation of a liquid comprising puncturable delivery wall". A pressure is typically built up within the capsule during water injection, which causes a lower face (or septum) of the cartridge to open thence, enabling the output of the liquid to be prepared. Since the output of the beverage to be prepared takes place at the lower face of the capsule with no contact with opening means of the dispenser, the flow of the liquid can be directly poured into the receptacle, e.g. a baby bottle, without contaminating the surfaces of the device. This results in a very hygienic preparation and delivery of the nutritional preparation.

Of course, the present method can apply to other groups of persons such as athletes during training or preparing for competitions or persons under medication or treatment for which a followed regime is required over a certain period of time.

EXAMPLE

An example of nutritional feeding plan for infant using a range of capsules according to the invention is given below. The nutritional feeding plan is designed for providing a balanced regime to infants from the age of 0 to 12 months. As will be appreciated by those skilled in the art, in addition to the nutriments specified below as a preferred example, the exemplified infant formulae will also contain other ingredients usually found in such products notably including, probiotics, prebiotics, micronutrients e.g., nucleotides, vitamins and minerals. It should be noted that the plans could expand to provide additional capsules of large size for young children of respectively, 13 to 24 months and 24 to 36 months as well as a capsule containing a neonatal supplement.

TABLE

| Capsule | Size | Small | Small | Medium | Medium | Medium | Large | Large |
|---|---|---|---|---|---|---|---|---|
| | Capsule size (ml) | 40 | 40 | 60 | 60 | 60 | 85 | 85 |
| | Binary Code | 000 | 001 | 010 | 100 | 011 | 101 | 110 |
| Basics | Formula | TN1 | TN2 | TN3 | TN4 | TN5 | TN6 | TN7 |
| | Age range | $1^{st}$ and $2^{nd}$ wk | $3^{rd}$ and $4^{th}$ wk | $2^{nd}$ mo | $3^{rd}$ and $4^{th}$ mo | $5^{th}$ and $6^{th}$ mo | 7th and 8th mo | 9th to 12th mo |
| | Powder (Formula) volume before capsule filling (ml) | 38.5 | 49.8 | 56 | 59.7 | 66 | 67 | NA |
| | Reconstitution Volume (Range in ml) | 75-110 Pref. 90 | 90-140 Pref. 120 | 120-170 Pref. 145 | 140-190 Pref. 165 | 150-210 Pref. 180 | 180-240 Pref. 210 | 180-260 Pref. 210 |
| | Capsule Contents (Range in g) | 9-14 | 11-18 | 15-22 | 18-25 | 20-28 | 21-29 | 20-28 |
| Proteins | Content (g/l) | 14.6 | 12.4 | 11.3 | 11.3 | 11.3 | 11.3 | 11.0 |
| | Whey:Casein | 70:30 | 60:40 | 60:40 | 60:40 | 60:40 | 50:50 | 50:50 |
| Carbohydrates | Type | Lactose | Lactose | Lactose | Lactose | Lactose | Lactose | Lactose:Maltodextrin (70:30) |
| | Content (g/l) | 65.7 | 72.2 | 73.1 | 73.1 | 73.1 | 66.8 | 64.7 |
| Lipids | Type | Milk & Veg. | Milk & Veg. | Milk & Veg. | Milk & Veg. | Milk & Veg. | Veg. | Veg. |
| | Content (g/l) | 36.4 | 34.5 | 32.1 | 32.1 | 32.1 | 35.3 | 34.2 |

The invention claimed is:

1. A nutritional delivery system comprising:
a dispenser for providing water to a single-use capsule containing a portion-controlled serving of a nutritional formula;
a plurality of different types of capsules that relate to a nutritional feeding plan, each type of capsule comprising capsules containing an infant formula;
the different types of capsules having at least one differentiating characteristic;
a control operation related to each type of capsule comprising information relating to at least one differentiating operational parameter providing an automatic control for producing and delivering a differentiated nutritional liquid in the dispenser according to the nutritional feeding plan,
wherein the at least one differentiating characteristic of each type of capsules and the at least one differentiating operational parameter vary according to the age of the person to be fed, the different types of capsules are differentiated from each other by the type or content of a nutrient selected from the group consisting of proteins, carbohydrates, lipids, probiotics, micronutrients, and combinations thereof in the infant formula in the capsule; and at least two different types of capsules are differentiated from each other by an amount of protein contained therein, wherein the protein content decreases in the different types of capsules with an increase of age of an infant to be fed, and wherein the protein type includes whey and casein, the ratio of which decreases in the different types of capsules with an increase of age of an infant to be fed.

2. An infant nutritional delivery system using single-serve capsules, the system comprising:
a dispenser for a nutritional composition comprising a member that provides a volume of water into a single-use capsule containing a portion-controlled serving of a nutritional formula;
different types of capsules that are designed according to a nutritional feeding plan corresponding to infants or categories of infants to be fed, each type comprising capsules containing an infant formula, the capsules of different types having at least one differentiating characteristic so that each type of capsule corresponds to a feeding time period determined by the feeding plan; and
a control operation associated or related to each type of capsule, the control operation comprising information relating to at least one differentiating operational parameter and providing automatic control for producing and delivering a differentiated nutritional liquid in the dispenser according to the nutritional feeding plan, wherein the at least one differentiating characteristic of each type of capsules and the at least one differentiating operational parameter vary according to a range of age of the infant to be fed;
the different types of capsules are differentiated from each other by the type or content of a nutrient selected from the group consisting of proteins, carbohydrates, lipids, probiotics, micronutrients, and combinations thereof in the infant formula in the capsule; at least two different types of capsules are differentiated from each other by the amount of the infant formula as a function of the age of the infant to be fed; and at least two different types of capsules are differentiated from each other by an amount of protein contained therein, wherein the protein content decreases in the different types of capsules with an increase of age of an infant to be fed, and wherein the protein type includes whey and casein, the ratio of which decreases in the different types of capsules with an increase of age of an infant to be fed;

the at least one differentiating operational parameter is the volume of water provided into the capsule to mix with the infant formula in the capsule to reconstitute the nutritional liquid, and the volume of water for reconstituting the nutritional liquid is automatically adjusted by the control operation based on the function of the type of capsule.

3. The system of claim 2, wherein the types of capsules are differentiated by at least their size which differs for at least two different types of capsules.

4. The system of claim 2, wherein the amount of the infant formulae per size varies according to the following weight distribution:

between 5 and 17 grams solids for a "Small" capsule;
between 13 and 27 grams solids for a "Medium" capsule and,
between 20 and 38 grams solids for a "Large" capsule.

5. The system of claim 3, wherein within each size of capsules, each type of capsule contains a different amount of infant formula.

6. The system of claim 2, wherein the infant formula differs according to at least:
the proteins source, the carbohydrates source, carbohydrate content, the lipids source and lipids content.

7. The system of claim 2, wherein the volume of water is automatically adjusted by the control operation without allowing the user to modify such volume.

8. The system of claim 2, wherein the control operation is configured to automatically increase or decrease a volume of water for reconstituting the nutritional liquid as a function of the size of the capsule.

9. The system of claim 2, wherein the control operation comprises a code associated to each type of capsule and a reader associated to the dispenser for reading the code and a control unit configured to control the preparation of the nutritional liquid according to the at least one differentiating parameter relating to the code.

10. The system of claim 2, wherein the control operation comprises a plurality of visual marks on the capsules, each mark corresponding to one type of capsules, and a multi-choice activation on the dispenser matching the plurality of visual marks and operating a control unit configured to control the preparation of the nutritional liquid according to the differentiating parameter relating to the choice made by the user on the multi-choice activation.

11. The system of claim 2, wherein the nutritional feeding plan is an infant feeding plan which provides a feed regime for infants that follows a time period corresponding to a growth period of the infant covering several age ranges.

\* \* \* \* \*